US006344919B1

(12) United States Patent
Dutta et al.

(10) Patent No.: US 6,344,919 B1
(45) Date of Patent: Feb. 5, 2002

(54) METHODS AND SYSTEMS FOR PRODUCING LINEAR POLARIZATION STATES OF LIGHT AT THE END OF A LENGTH OF OPTICAL FIBER

(75) Inventors: Ranjan Dutta, Lawrenceville, NJ (US); William R. Holland, Warrington, PA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/565,387

(22) Filed: May 5, 2000

(51) Int. Cl.[7] ................... G02F 26/08; G02F 1/03; G02F 1/29; H04B 10/08; G01N 21/00; G01J 4/00

(52) U.S. Cl. .................. 359/301; 359/110; 359/246; 359/251; 359/298; 356/73.1; 356/367; 356/368

(58) Field of Search ................. 356/367, 368, 356/366, 73.1; 385/28; 359/110, 122, 246, 251, 298, 301

(56) References Cited

U.S. PATENT DOCUMENTS 5,227,623 A * 7/1993 Heffner ................ 250/225
5,790,275 A * 8/1998 Iizuka ................ 358/474

FOREIGN PATENT DOCUMENTS

JP      63-229926 A  *  9/1988  ........... H04B/9/00

OTHER PUBLICATIONS

D. Andresciani, F. Curti, F. Matera, and B. Daino, "Measurement of the group–delay difference between the principal states of polarization on a low–birefringence terrestrial fiber cable," Optics Lett. 12, 1987, pp. 844–846.*

* cited by examiner

Primary Examiner—Georgia Epps
Assistant Examiner—David N. Spector
(74) Attorney, Agent, or Firm—John E. Curtin, Esq.; Troutman Sanders, LLP

(57) ABSTRACT

Methods and devices are provided for quickly producing all possible linear polarization states of light at the output of a length of optical fiber. Linearly polarized light is input and is transmitted through a fiber. Due to the birefringence of the fiber, light at the output of the fiber is elliptically polarized irrespective of the input polarization. The elliptically polarized states of light at the output are generated as an arbitrary circle on an output Poincare sphere. This arbitrary circle is then manipulated to produce a final circle substantially coinciding with the equator of the Poincare sphere. This final circle represents all possible linear polarization states at the output of the fiber. The invention eliminates the need for determining transformation matrices and performing point-by-point calculations in order to obtain input polarization settings for polarization-based, passive optical network ("PON") testing.

25 Claims, 4 Drawing Sheets

METHODS AND SYSTEMS FOR PRODUCING LINEAR POLARIZATION STATES OF LIGHT AT THE END OF A LENGTH OF OPTICAL FIBER

BACKGROUND OF THE INVENTION

In a fiber optic network, it is desirable to produce all possible linear polarization states of light at the end of a length of fiber in order to perform polarization-based, PON testing. Typically, however, instead of being linearly polarized, the light at the end of an arbitrary length of fiber is elliptically polarized irrespective of the polarization state of the light at the beginning of the fiber. This is due to the "birefringence" effect of the fiber. Birefringence causes light traveling through a fiber to split into a fast traveling wave component and a slow traveling wave component. When these two components are recombined at some point, their relative phase is different from their initial relative phase. This phase difference causes the polarization state of the light to change to a new elliptically polarized state. Therefor, methods and devices are needed to convert the elliptically polarized light at the end of a fiber to all possible linearly polarized states of light in order to facilitate polarization-based PON testing.

One method uses a transformation matrix and performs point-by-point calculations to derive input polarizations that will produce all possible linear polarization states. This method is time-consuming and inefficient, however.

It is therefor a desire of the present invention to provide methods and devices for producing all possible linear polarization states of light at the end of an arbitrary length of fiber which can be completed quickly.

SUMMARY OF THE INVENTION

In accordance with the present invention, there are provided methods and devices for producing all possible linear polarization states of light at the output of an optical fiber. According to the present invention, elliptically polarized light is detected at an output of a fiber and an output Poincare sphere is generated to represent an output polarization space for light at the output of the fiber. Various output polarization states are then generated such that the output polarization states form an arbitrary circle on the output Poincare sphere. Through steps which will be described in detail in the paragraphs that follow, the arbitrary circle is then manipulated to form a final circle which substantially coincides with an equator of the output Poincare sphere. The final circle represents all possible linear polarization states of light at the output of the fiber.

In an illustrative embodiment of the present invention, a novel system comprises a laser source, an input polarization controller and a set of wave plates to send light through an arbitrary length of fiber. Poincare spheres are used to represent polarization spaces for light waves. The polarization states of light at an output of the polarization controller and at an output end of the fiber are represented on a reference Poincare sphere and an output Poincare sphere, respectively. The output polarization state of light at the end of the fiber is displayed on a monitor as a point on the output Poincare sphere. The reference Poincare sphere need not be displayed, as it represents an intermediate polarization space of light in the system. Various components, which will later be described in detail, are then used to transform the polarization states of light so as to produce all possible linear polarization states of light at the end of the fiber. Another illustrative embodiment of the present invention employs a programmed device comprising a program and program code to perform substantially the same functions as the system.

In one step of a novel transformation method, an equatorial polarization angle "$\theta$", located in a plane containing an equator of the reference Poincare sphere, is continuously swept from 0° to 360° at the output of the polarization controller (i.e., input of the fiber). Sweeping $\theta$ in such a manner causes the polarization states at the output of the fiber to trace an arbitrary circle on the output Poincare sphere. An input polarization of a source light input into the polarization controller is then adjusted such that, as $\theta$ is swept from 0° to 360° at the output of the polarization controller, the arbitrary circle traced on the output Poincare sphere becomes smaller and smaller until it forms a reduced circle of a minimum radius. Next, the reduced circle is transformed so that it is centered at a pole of the output Poincare sphere. Finally, the input polarization of the source light is again adjusted so as to enlarge the transformed circle until the circle substantially coincides with the equator of the output Poincare sphere. The circle at the equator of the output Poincare sphere defines all possible linear output polarization states of light at the end of the fiber.

The present invention and its advantages can be best understood with reference to the drawings, detailed description of the invention and claims which follow.

Other objectives, features and advantages of the present invention will become apparent to those skilled in the art from the following description taken in conjunction with the accompanying drawings.

DETAILED DESCRIPTION OF THE INVENTION

Figure 1:
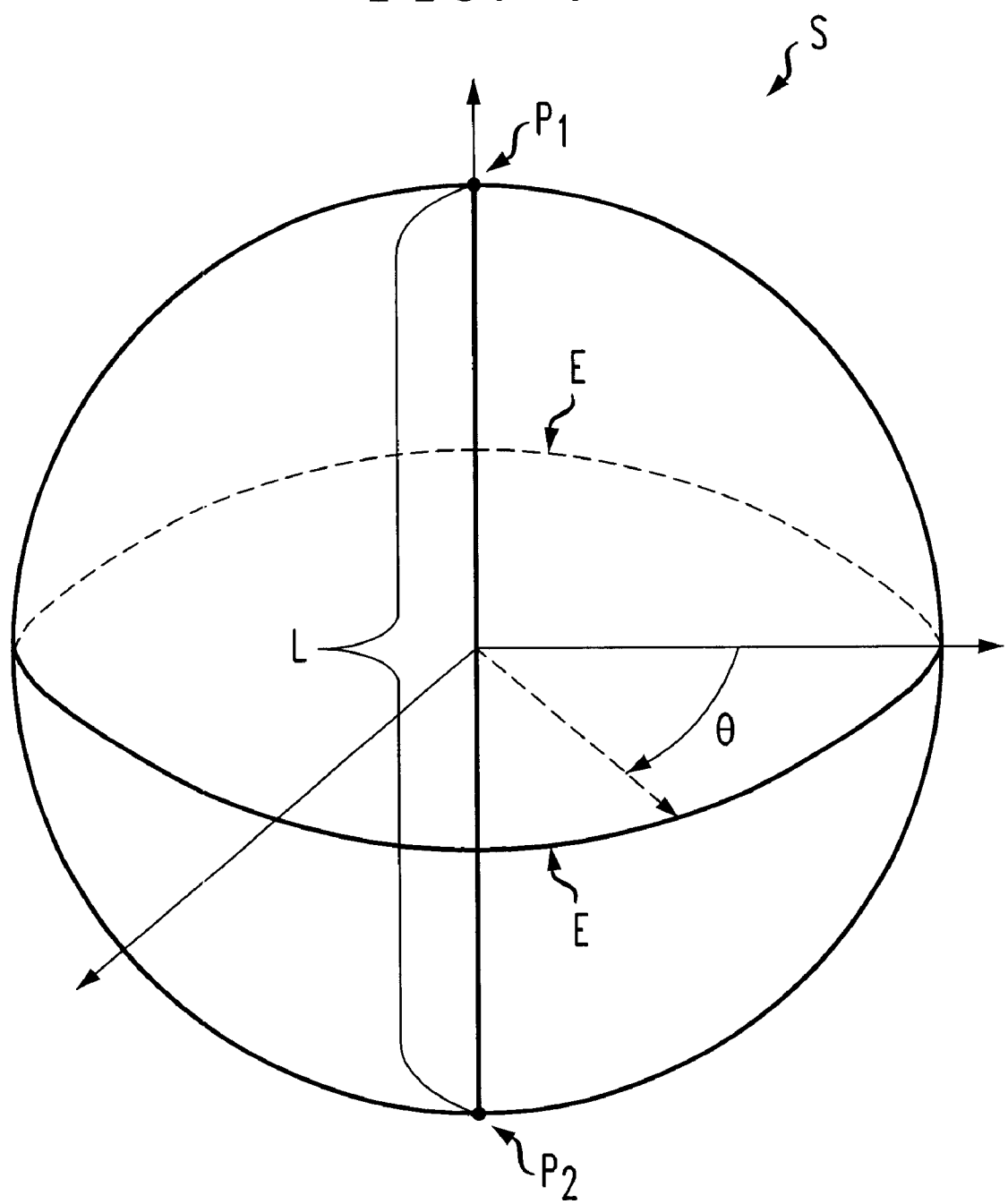
FIG. 1 depicts a reference Poincare sphere which can be used to explain a method of converting elliptically polarized light to linearly polarized light according to one embodiment of the present invention.

Referring to FIG. 1, a reference Poincare sphere "S" is shown. The sphere S represents a polarization space which comprises all of the possible polarized states of light: linear (i.e., an electric field vector oscillates in a plane perpendicular to the direction of the propagation of the light wave), circular (i.e., the direction of the oscillation of an electric field vector spins at a constant rate with no preference to a specific direction of oscillation) and elliptical (i.e., the intensity of an electric field vector varies in different directions of oscillation). The sphere S contains two poles "$P_1$" and "$P_2$", a line "L" joining the two poles, an equator "E" and an equatorial polarization angle "$\theta$". Any point located at the equator E of the sphere S represents a linear polarization state. Points located at the poles $P_1$ and $P_2$ of the sphere S represent circular polarization states. All other points on the sphere S indicate elliptically polarized states.

In an illustrative embodiment of the present invention, the sphere S can be used to explain how elliptically polarized light can be converted into linearly polarized light.

Figure 2:
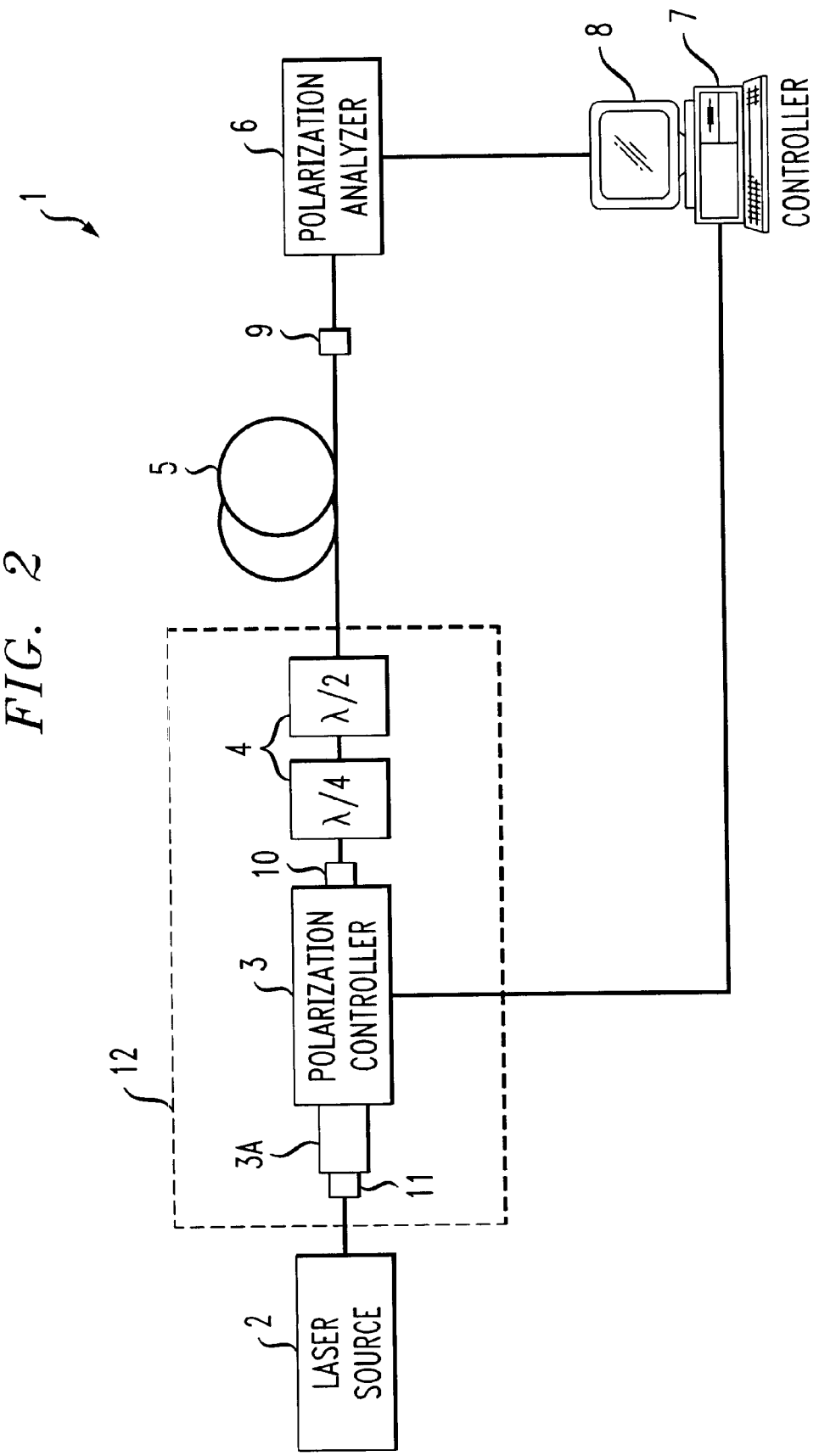
FIG. 2 depicts a system for producing linearly polarized light according to one embodiment of the present invention.
Figure 3:
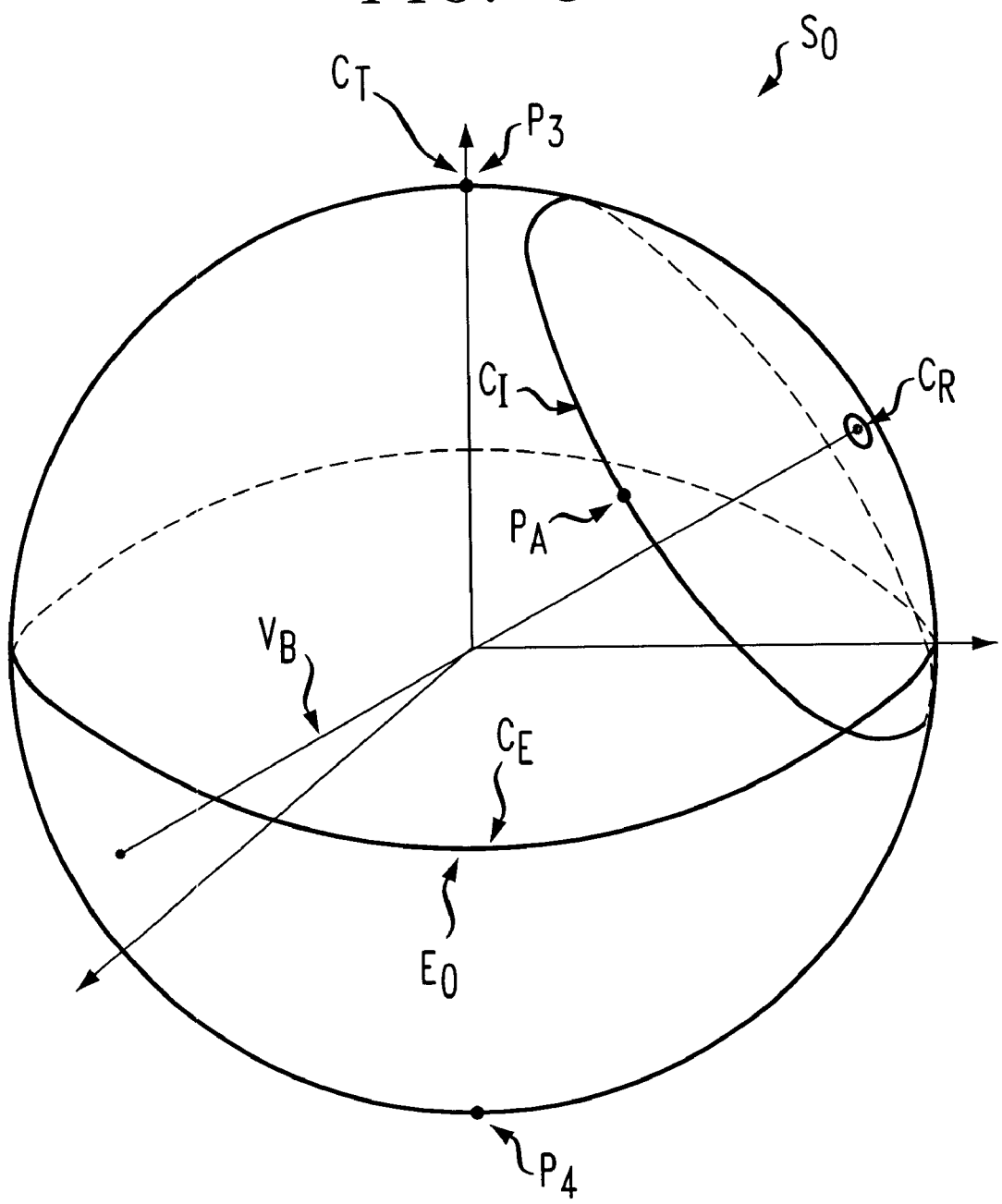
FIG. 3 depicts an output Poincare sphere which represents output polarization states according to one embodiment of the present invention.

Referring to FIG. 2, a system 1 for producing all possible linear polarization states of light is shown according to an illustrative embodiment of the present invention. The system 1 comprises a laser source 2, optical fiber 5, polarization analyzer or analyzer means 6, polarization conversion unit or means 12, system controller or control means 7 and display or display means 8. In an illustrative embodiment of the present invention, polarization conversion unit 12 comprises polarization controller or control means 3 and variable wavelength wave plates or means 4. The laser source 2 is adapted to send light having a linear input polarization through the fiber 5. Referring to FIG. 2 and FIG. 3, the polarization analyzer 6 is adapted to detect elliptically polarized light at an output 9 of the fiber 5. Polarization analyzer 6 is further adapted to generate an output Poincare sphere $S_O$. The system controller 7 is adapted to control the polarization conversion means 12 to generate output polarization states in the form of an arbitrary circle $C_I$ on the output Poincare sphere $S_O$. The polarization conversion unit 12 is further adapted to manipulate the arbitrary circle $C_I$ such that it forms a final circle $C_E$ which substantially coincides with an equator $E_O$ of the output Poincare sphere $S_O$, thus representing all possible linear polarization states of light at the output 9 of the fiber. Backtracking a little, as just summarized and as will be explained in detail shortly, the present invention has as one of its goals to produce all possible linear polarization states of light. One way of visually indicating this is to center a circle at an equator of a Poincare sphere as set forth in "Polarized Light, Fundamentals and Applications" by Edward C. Collett (1993). So it is clear that Collett does not teach or suggest the solution set forth in the present invention; he does, however, equate the equator of a Poincare sphere with linearly polarized light. Continuing, display 8 is adapted to display the output Poincare sphere $S_O$ the arbitrary circle $C_I$ and the manipulation of the arbitrary circle $C_I$.

In one embodiment of the invention, the polarization analyzer 6 comprises an HP 8509B Polarization Analyzer. However, other comparable devices may be used.

In a further embodiment of the invention, the polarization controller 3 comprises an HP 8169A Polarization Analyzer which in turn comprises an input polarizer 3a. Again, other similar devices may be used.

It should be realized that although the system 1 is depicted as comprising multiple components, the invention is not so limited. One or more of the components may be combined into one or further broken down into additional components.

The operation of the system 1 will now be discussed in detail. The laser source 2 transmits a source light through polarization controller 3, wave plates 4, fiber 5 and polarization analyzer 6. Initially, the input polarizer 3a is adapted to select a linear input polarization at a given angle with respect to an optical axis of the polarizer. Wave plates 4 are adapted to be oriented at a zero orientation. When the polarizer 3a is oriented such that the source light enters the polarizer input 11 at an input polarization angle of 0°, the polarization controller 3 is adapted to produce all possible linear polarization states at a variable output 10. However, when the input polarizer 3a is oriented such that the source light enters the polarizer at an angle other than 0° with respect the optical axis of the polarizer, the polarization controller 3 produces elliptically polarized light at its output 10. As the light travels through the fiber 5, the polarization of the light changes from the polarization at the input of the fiber according to the total birefringence of the fiber 5. Graphically, the polarization changes can be tracked and represented using an output Poincare sphere $S_O$ shown in FIG. 3. Sphere $S_O$ has an equator $E_O$ and poles $P_3$ and $P_4$. The reference sphere S, produced at the variable output 10 of the polarization controller 3, comprises a reference polarization space which represents the possible polarization states of light at the output of the polarization controller. For light exiting the end of the fiber 5, birefringence causes the reference sphere S to rotate and transform, forming a new output Poincare sphere $S_O$. In sphere $S_O$, the line "L" that joins poles $P_1$ and $P_2$ of sphere S now points in an arbitrary, new direction, forming a line $V_B$ in sphere $S_O$. Thus, the sphere $S_O$ represents an output polarization space which represents the possible ovation states of light at the end of the fiber 5.

In an illustrative embodiment of the invention, the polarization analyzer 6 is adapted to detect the output polarization states of light at the end or output 9 of the fiber 5. Once these states are detected, the polarization analyzer 6 is further adapted to generate the output Poincare sphere $S_O$ using the detected states. Thereafter, the polarization analyzer 6 is further adapted to transmit the sphere $S_O$ to display 8.

In an illustrative embodiment of the invention, an elliptical polarization state $P_A$ is located on Poincare sphere $S_O$ in FIG. 3. The point $P_A$ represents a fiber output polarization vector (not shown) exiting at the output 9 of the fiber 5. This vector is elliptically polarized, because the point $P_A$ is not located at a pole or equator of the sphere $S_O$. As envisioned by the present invention, circle $C_I$ is formed by creating multiple polarization states at the end of the fiber 5.

For example, the polarization controller 3 is adapted to sweep the angle θ of the reference Poincare sphere S from 0° to 360° by changing the orientation of the variable output 10. The location of the variable output 10 is also the location of the input of the fiber 5. System controller 7 is operatively connected to the polarization controller 3 and is adapted to control the continuous and repeated sweeping of the angle θ at the variable output 10 from 0° to 360° throughout the operation of the system 1. In the illustrative embodiment shown in FIG. 2, the system controller 7 comprises a computer. As θ is swept continuously, the output polarization states at the end of the fiber 5 (each state being a point on the sphere $S_O$) change and the output polarization vectors thereby trace an arbitrary initial circle $C_I$ around the vector $V_B$ on sphere $S_O$.

In order to convex elliptically polarized states at the end of fiber 5 to all possible linearly polarized states, the circle $C_I$ must be manipulated such that it forms a circle which falls substantially over the equator E of the sphere $S_O$. This manipulation requires altering the circle $C_I$ such that the circle $C_I$ becomes a circle $C_T$ centered at the pole $P_3$ of the sphere $S_O$, and then enlarging the circle to form circle $C_E$ which substantially coincides with equator $E_O$. In an illustrative embodiment of the invention, circle $C_I$ is relatively large with respect to the size of the sphere $S_O$. This makes it difficult to center the circle at the pole. Because of this, the input polarizer 3a is adapted to reduce the circle $C_I$ to a circle of smaller radius prior to the circle being centered at the pole $P_3$. To achieve this reduction in radius, the input polarizer 3a is adapted to vary the input polarization angle of the source light at an input 11 of the polarization controller 3 until it approaches 45°. This minimizes the angle between the fiber output polarization vectors and the vector $V_B$ such that the output polarization vectors trace a reduced circle $C_R$ of a minimum radius around the vector $V_B$. According to one embodiment, the input polarization of the source light may be changed by manually adjusting the orientation of input polarizer 3a. However, the present invention envisions other embodiments where this can be accomplished by automated software and/or hardware as well.

Now that the small circle $C_R$ has been generated, it can be moved such that it is centered at the pole $P_3$. In an illustrative embodiment of the present invention, the wave plates 4 are adapted to center the circle $C_R$ at the pole $P_3$ of the sphere $S_O$, thereby forming transformed circle $C_T$. The transformation of circle $C_R$ to circle $C_T$ is accomplished as follows. In one embodiment of the invention, variable wave plates 4 are adapted to provide phase changes to components of the light waves transmitted through the fiber 5. More specifically, the variable wave plates 4 comprise variable wave plates whose orientation may be changed to align the vector $V_B$ with the pole $P_3$, thereby forming transformed circle $C_T$ at the pole $P_3$. This operation effectively compensates for the birefringence of the fiber 5. More specifically, the variable wave plates 4 may comprise two plates, each plate being adapted to provide a maximum phase change of a quarter wavelength and a half wavelength, respectively. According to one embodiment, the orientation of variable wave plates 4 may be changed manually. However, the present invention envisions other embodiments where this can be accomplished by automated software and/or hardware.

Continuing, once the circle $C_T$ is generated the input polarizer 3a is adapted to adjust the polarization of the source light at the input 11 of the polarization controller 3 such that the circle $C_T$ grows larger and larger until it substantially coincides with, or falls substantially over, the equator $E_O$ of the sphere $S_O$. A final circle, $C_E$, now represents a polarization area which comprises all possible linear polarization states at the output of the fiber 5.

All possible linear polarization states can thus be obtained and used for polarization-based PON testing. It should be noted that although the circle $C_E$ does not necessarily have to fall exactly over the equator $E_O$ for PON testing, it is desirable to place the circle $C_E$ exactly over the equator $E_O$ in order to produce more accurate results. Though the discussion above focuses on a device for producing all possible linear polarization states at the output of a fiber, the present invention is not so limited. In addition to devices, the present invention envisions programmed devices and methods for carrying out the features and functions of the inventions described above.

Figure 4:
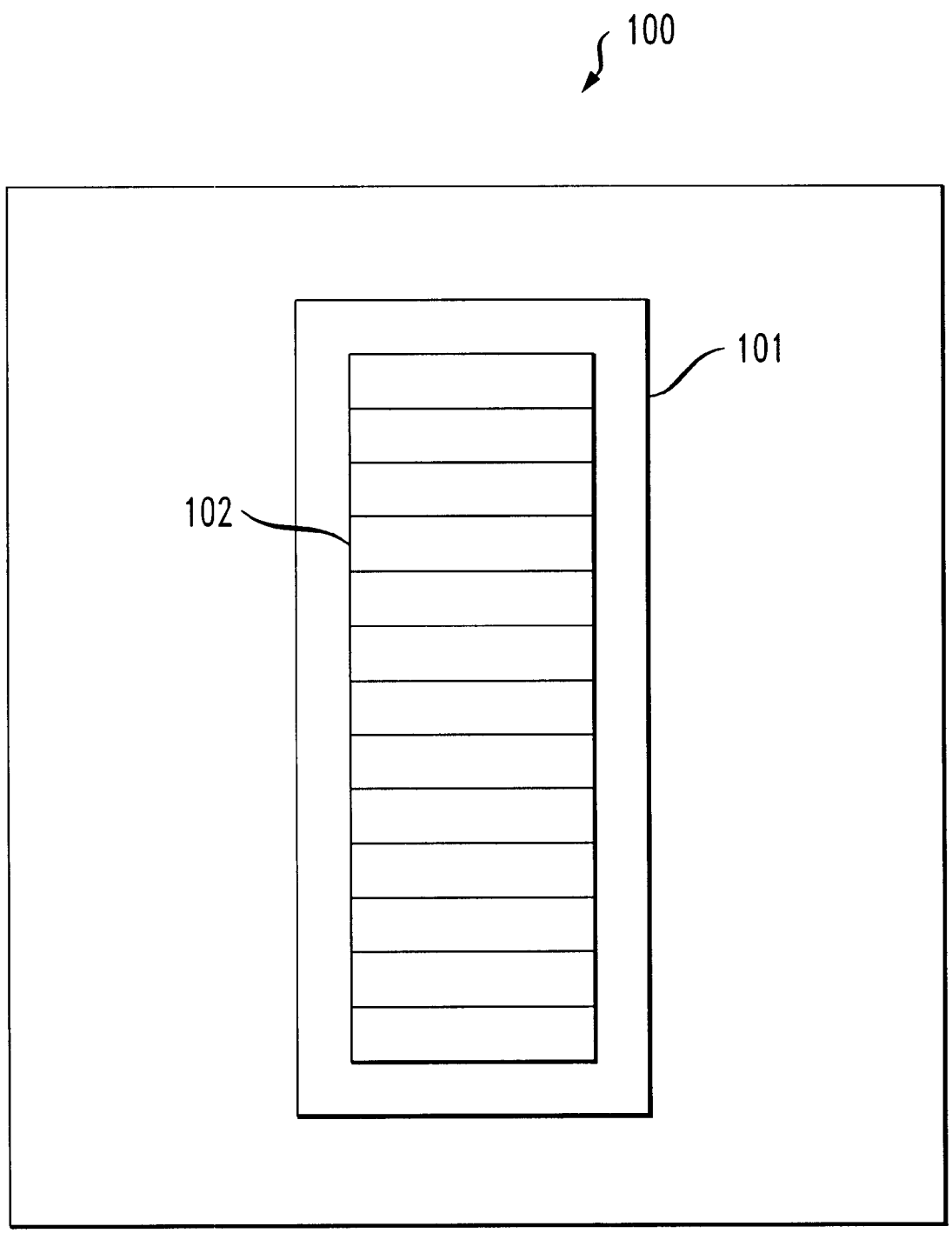
FIG. 4 depicts a programmed device for producing linearly polarized light according to another embodiment of the invention.

For example, some of the features and functions of device 1 and its components may be carried out by a programmed device 100 shown in FIG. 4. Programmed device 100 may comprise a recordable medium such as a floppy diskette or hard drive, or hardware devices such as microprocessors, memory components or a combination of microprocessors and memory components. Programmed device 100 comprises program of program means 101. In turn, program 101 comprises program code 102 adapted to control and/or carry out some, or all, of the previously described features and functions. More specifically, program 101 may comprise program code 102 adapted to control the functions of detecting and analyzing output polarization states, displaying a Poincare sphere and output polarization states, or adjusting input polarizations, to give just a few examples.

The present invention eliminates the need for determining a transformation matrix and performing point-by-point calculations in order to derive the settings of the polarization controller.

It is to be understood that changes and variations may be made without departing from the spirit and scope of this invention as defined by the claims that follow.

We claim:

1. A method for producing linear polarization states of light at an output of an optical fiber comprising:

detecting elliptically polarized light at an output of an optical fiber;

generating an output Poincare sphere representing a polarization space for light at the output of the fiber;

generating output polarization states from the elliptically polarized light which form an arbitrary circle on the output Poincare sphere; and manipulating the arbitrary circle such that it becomes a final circle substantially coinciding with an equator of the output Poincare sphere, wherein the final circle represents linear polarization states of light.

2. The method as in claim 1 wherein the final circle represents all possible linear polarization states of light.

3. The method as in claim 1 further comprising displaying the arbitrary circle and the final circle on the output Poincare sphere.

4. The method as in claim 1 further comprising transmitting a source light having a linear input polarization through the fiber prior to detecting the elliptically polarized light at the output of the fiber.

5. The method as in claim 1 wherein generating the arbitrary circle further comprises sweeping an equatorial polarization angle $\theta$ from 0° to 360° at an input of the fiber.

6. The method as in claim 5, wherein generating the arbitrary circle further comprises continuously and repeatedly sweeping the angle $\theta$ from 0° to 360° at the input of the fiber.

7. The method as in claim 1 wherein manipulating the arbitrary circle further comprises:

adjusting an input polarization of a source light such that the arbitrary circle becomes a reduced circle of a minimum radius;

centering the reduced circle at a pole of the output Poincare sphere to form a transformed circle; and further adjusting the input polarization of the source light such that the transformed circle substantially coincides with the equator of the output Poincare sphere to form the final circle.

8. The method as in claim 7 further comprising displaying the arbitrary circle, the reduced circle, the transformed circle and the final circle on the output Poincare sphere.

9. A system for producing linear polarization states of light at an output of an optical fiber comprising:

a polarization analyzer adapted to detect elliptically polarized light at an output of an optical fiber, to generate an output Poincare sphere at the output of the fiber and to generate output polarization states from the elliptically polarized light to form an arbitrary circle on the output Poincare sphere; and a polarization conversion unit adapted to manipulate the arbitrary circle to form a final circle substantially coinciding with an equator of the output Poincare sphere, wherein the final circle represents linear polarization states of light.

10. The system as in claim 9 wherein the final circle represents all possible linear polarization states of light.

11. The system as in claim 9 further comprising a display adapted to display the arbitrary circle and the final circle on the output Poincare sphere.

12. The system as in claim 9 further comprising a laser source adapted to transmit a source light having a linear input polarization through the fiber.

13. The system as in claim 9 wherein the polarization conversion unit is further adapted to sweep an equatorial polarization angle $\theta$ from 0° to 360° at an input of the fiber to form the arbitrary circle on the output Poincare sphere.

14. The system as in claim 13 further comprising a system controller adapted to control continuous and repeated sweeping of the angle θ from 0° to 360° at the input of the fiber to form the arbitrary circle.

15. The system as in claim 13 wherein the polarization conversion unit further comprises a polarization controller adapted to sweep the equatorial polarization angle θ from 0° to 360° at the input of the fiber.

16. The system as in claim 15 wherein the polarization controller comprises an input polarizer adapted to reduce the arbitrary circle to a reduced circle of a minimum radius by varying an input polarization of a source light at an input of the polarization controller.

17. The system as in claim 16 wherein the polarization conversion unit further comprises a set of variable wave plates adapted to move the reduced circle so as to form a transformed circle at a pole of the output Poincare sphere.

18. The system as in claim 17 wherein the input polarizer is further adapted to convert the transformed circle to the final circle by adjusting the polarization of the source light at the input of the polarization controller such that the transformed circle substantially coincides with the equator of the output Poincare sphere.

19. The system as in claim 18 further comprising a display adapted to display the arbitrary circle, the reduced circle, the transformed circle and the final circle on the output Poincare sphere.

20. A programmed device for producing linear polarization states of light at an output of an optical fiber, said programmed device comprising program code for:

controlling the detection of elliptically polarized light at an output of an optical fiber;

controlling the generation of an output Poincare sphere at the output of the fiber;

controlling the generation of output polarization states from the elliptically polarized light which form an arbitrary circle on the fiber output Poincare sphere; and controlling the manipulation of the arbitrary circle such that it becomes a final circle substantially coinciding with an equator of the output Poincare sphere, wherein the final circle represents linear polarization states of light.

21. The programmed device as in claim 20 wherein the final circle represents all possible linear polarization states of light.

22. The programmed device as in claim 20 further comprising program code for controlling the display of the arbitrary circle and the final circle on the output Poincare sphere.

23. The programmed device as in claim 20 wherein the program code for controlling the formation of the arbitrary circle on the output Poincare sphere comprises program code for controlling the sweeping of an equatorial polarization angle θ from 0° to 360° at an input of the fiber.

24. The programmed device as in claim 23 wherein the program code for controlling the manipulation of the arbitrary circle comprises program code for:

controlling the adjustment of an input polarization of the source light such that the arbitrary circle becomes a reduced circle of a minimum radius;

controlling the centering of the reduced circle at a pole of the output Poincare sphere to form a transformed circle; and controlling the further adjustment of the input polarization of the source light such that the transformed circle substantially coincides with the equator of the output Poincare sphere to form the final circle.

25. The programmed device as in claim 24 further comprising program code for controlling the display of the arbitrary circle, the reduced circle, the transformed circle and the final circle on the output Poincare sphere.

* * * * *